United States Patent [19]
Bartlett

[11] 4,118,002
[45] Oct. 3, 1978

[54] APPARATUS FOR CONNECTING A VACUUM CLEANER AND SOLUTION TANK AS A CLEANING SOLUTION-EXTRACTION CLEANER

[76] Inventor: Robert N. Bartlett, 2310 S. Holly St., Denver, Colo. 80222

[21] Appl. No.: 803,453

[22] Filed: Jun. 6, 1977

[51] Int. Cl.² ............................................. F16M 13/02
[52] U.S. Cl. ............................... 248/311.1 R; 15/321; 15/339; 211/71; 248/149
[58] Field of Search ............. 15/320, 321, 323, 327 C, 15/339; 211/71, 85, 133; 248/146, 150, 149, 311.1

[56] References Cited

U.S. PATENT DOCUMENTS

| | | | |
|---|---|---|---|
| 1,383,779 | 7/1921 | Workman | 211/85 X |
| 2,028,098 | 1/1936 | Zafuta | 248/150 X |
| 2,030,775 | 2/1936 | Twiss | 248/150 X |
| 2,048,608 | 7/1936 | Holland | 248/150 |
| 2,513,630 | 7/1950 | Elliott | 248/146 X |
| 2,679,996 | 6/1954 | Rowe et al. | 248/149 |
| 3,290,716 | 12/1966 | Cain | 15/320 X |
| 3,431,582 | 3/1969 | Grave | 15/321 |

FOREIGN PATENT DOCUMENTS 2,025,546   12/1971   Fed. Rep. of Germany ............. 15/321

*Primary Examiner*—Christopher K. Moore
*Attorney, Agent, or Firm*—Ralph F. Crandell; John R. Ley

[57] ABSTRACT

A connecting apparatus connects a wet dry vacuum cleaner in a vertically spaced relationship with a solution tank. Cleaning solution is dispensed from the solution tank to the article to be cleaned, such as a carpet, and thereafter extracted from the article by the wet dry vacuum cleaner. The connecting apparatus allows a pre-existing vacuum cleaner to be combined with the solution tank, or allows the vacuum cleaner to be disassociated from its associated apparatus of the cleaning solution - extraction type cleaning apparatus. The connecting apparatus itself comprises a plurality of elongated arm members extending essentially from a common connection point, and bracket members are attached to each arm member to contact the vacuum cleaner and solution tank for retaining the vacuum cleaner and solution tank in an essentially vertically spaced relationship. The solution tank can be formed as a part of a movable cart-like device with the vacuum cleaner positioned essentially vertically above the solution tank by the connecting apparatus, or the connecting apparatus positions the solution tank essentially vertically above the vacuum cleaner.

2 Claims, 6 Drawing Figures

APPARATUS FOR CONNECTING A VACUUM CLEANER AND SOLUTION TANK AS A CLEANING SOLUTION-EXTRACTION CLEANER

BACKGROUND OF THE INVENTION

1. Field of the Invention

The present invention relates to a connecting apparatus for retaining a wet dry vacuum cleaner in a vertically spaced relationship with a cleaning solution tank, whereby these combined elements are conveniently used as a cleaning solution — extraction type cleaning apparatus.

2. Brief Description of Prior Art

The typical prior art cleaning solution — extraction type cleaning apparatus is a hot water extraction cleaner primarily intended for cleaning carpets or the like. With this typical prior art arrangement, a cleaning solution tank receives a supply of hot water, and the hot water is pumped to a wand-like cleaning tool having a spray nozzle for distributing the hot water to the carpet. A vacuum nozzle of the wand-like cleaning tool is connected through a flexible conduit to a source of vacuum within the cleaner. The vacuum at the vacuum nozzle extracts the hot water cleaning solution and foreign matter from the carpet, and the foreign matter and cleaning solution are received within a return container of the hot water extraction cleaner.

The prior art hot water extraction cleaners are sold as a unit, with one housing member typically containing the solution tank, the vacuum source, the return container and the various controls and associated instrumentalities which secure operation of the hot water extraction cleaner. When purchased, the hot water extraction cleaner is relatively costly since the purchaser receives all of the foregoing elements operatively connected as the single unit.

Another type of hot water extraction cleaner employs a wet dry vacuum cleaner which is selectively connectable with a housing containing the solution tank and the control apparatus and other instrumentalities for securing combined operation of the wet dry vacuum cleaner and the solution tank. In such devices, the housing member is rigidly constructed to receive only the vacuum cleaner, or one of substantially the same size, which is intended for use as a part of the hot water extraction cleaner. These hot water extraction cleaners are also sold as a unit including the wet dry vacuum cleaner, and therefore are relatively expensive. Since the housing member is constructed to receive the wet dry vacuum cleaner of only one size and configuration, this vacuum cleaner is essentially a required element of apparatus in this type of hot water extraction cleaner.

One advantage of the prior art extraction cleaner employing a selectively removable wet dry vacuum cleaner is that the wet dry vacuum cleaner may be disconnected and removed from the associated elements and used for purposes other than hot water extraction. This is of significance to the user since the wet dry vacuum cleaner has a wide variety of different uses other than just as part of a hot water extraction cleaner, as is well known. Of course, the other type of hot water extraction cleaner in which the source of vacuum is formed as a part of the cleaner does not provide this advantage, since the source of vacuum and the return container are arranged only for the purpose of extracting hot water cleaning solution and foreign matter from the carpet or article to be cleaned. Because of this construction, it is not realistic nor is it intended that the source of vacuum be used as a vacuum cleaner separate from the other elements of the hot water extraction cleaner.

Even though more convenient, the hot water extraction cleaner employing a selectively removable wet dry vacuum cleaner gives rise to certain significant disadvantages. Since these hot water extraction cleaners are sold as a unit, the consumer is required to purchase the wet dry vacuum cleaner as a part of the cleaner. This is a disadvantage to many consumers who have previously purchased a wet dry vacuum cleaner for other purposes, since the consumer is required to purchase a second wet dry vacuum cleaner as a part of the extraction cleaner. However, even if this were not the case, there is a substantial probability that the pre-existing wet dry vacuum cleaner could not be readily combined with the housing member which receives the wet dry vacuum cleaner, because the housing member is typically constructed to receive only the single size and configuration of one particular type of wet dry vacuum cleaner. Conventional wet dry vacuum cleaners, of course, come in a variety of sizes, and its main body have various different configurations including cylindrically shaped canister bodies or square or rectangular bodies. Thus, a consumer having first purchased a wet dry vacuum cleaner must pay the additional cost of a second wet dry vacuum cleaner or of a vacuum source and return container, when that consumer obtains a prior art hot water extraction cleaner.

SUMMARY OF THE INVENTION

It is the general objective of this invention to provide a new and improved connecting apparatus for connecting a wet dry vacuum cleaner with a cleaning solution tank whereby the connected combination can be conveniently used as a hot water-or cleaning solution-extraction type cleaner. Another objective of the present invention is to provide a solution tank, connecting apparatus, and other associated elements which can be selectively combined with a preexisting conventional wet dry vacuum cleaner to form a hot water-or cleaning solution-extraction type cleaner.

According to the present invention, a wet dry vacuum cleaner is connected in an essentially vertically spaced relationship with a cleaning solution tank by a connecting apparatus. The connecting apparatus includes a plurality of elongated arm members operatively joined together at a common point and extending outward from the common point. Bracket means or members are attached to the elongated arm members to retain the wet dry vacuum cleaner and the solution tank in the vertically spaced relationship. The bracket members are selectively positionable to accommodate a variety of different sized and configured vacuum cleaners and solution tanks. The solution tank can be connected to a cart-like device with the vacuum cleaner positioned vertically above an open mouth of the solution tank by the connecting apparatus. Alternatively, the connecting apparatus positions the solution tank vertically above the wet dry vacuum cleaner to which wheels or other movable members are attached at the bottom portion of the vacuum cleaner to allow the elements connected in this manner to be moved conveniently to various locations for use.

By the present invention, it is no longer necessary to purchase a wet dry vacuum cleaner or the apparatus of a vacuum source as a part of a hot water-or cleaning solution-extraction type cleaning apparatus. The elements of the cleaning solution-extraction cleaning apparatus not including the wet dry vacuum cleaner can be purchased separately as a unit and attached by the connecting apparatus to a preexisting wet dry vacuum cleaner. Furthermore, a cleaning solution-extraction type cleaner assembled with the present connecting apparatus allows convenient and selective removal of the vacuum cleaner from the associated apparatus for uses other than as a cleaning solution-extraction type cleaner.

The features which characterize the invention are defined in the annexed claims. A preferred embodiment of the invention, as to its organization and method of operation, together with further objects and advantages, will best be understood by reference to the following brief description of the drawings and the detailed description of preferred embodiments.

DETAILED DESCRIPTION OF PREFERRED EMBODIMENTS

Figure 1:
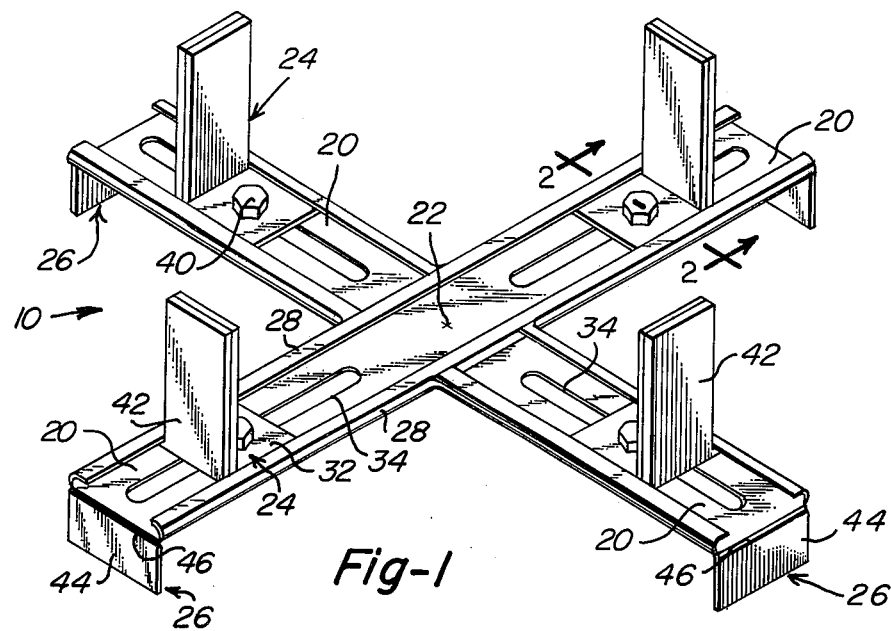
FIG. 1 is a perspective view of connecting apparatus comprising one embodiment of the present invention.
Figure 4:
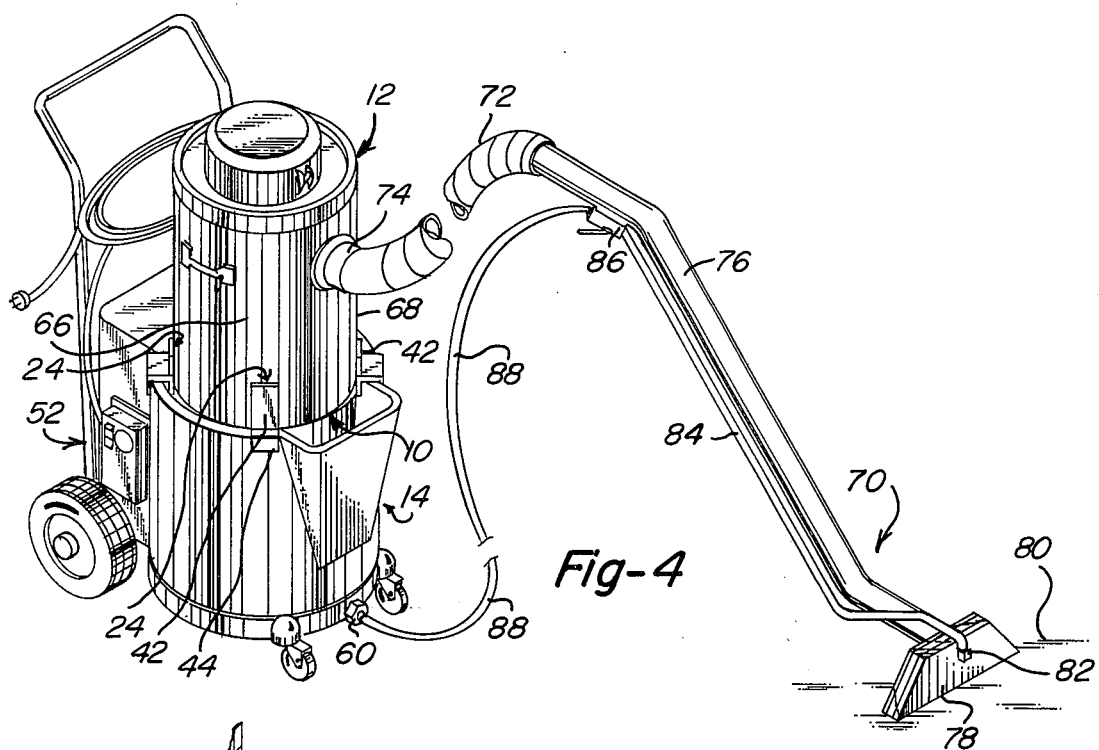
FIG. 4 is a perspective view similar to FIG. 3 and additionally illustrating a conventional wet dry vacuum cleaner and wand-like cleaning tool connected for use with the elements shown in FIG. 3.
Figure 5:
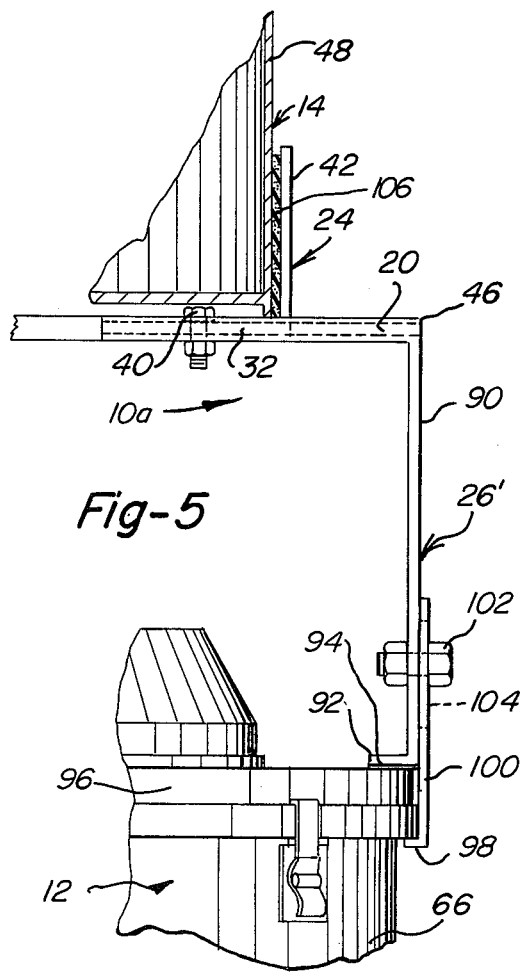
FIG. 5 is an enlarged elevational view of a portion of the connecting apparatus illustrating use of this embodiment of connecting apparatus with a wet dry vacuum cleaner and a solution tank, the remainder of the connecting apparatus not illustrated in FIG. 5 being similar to that previously illustrated in FIG. 1.
Figure 6:
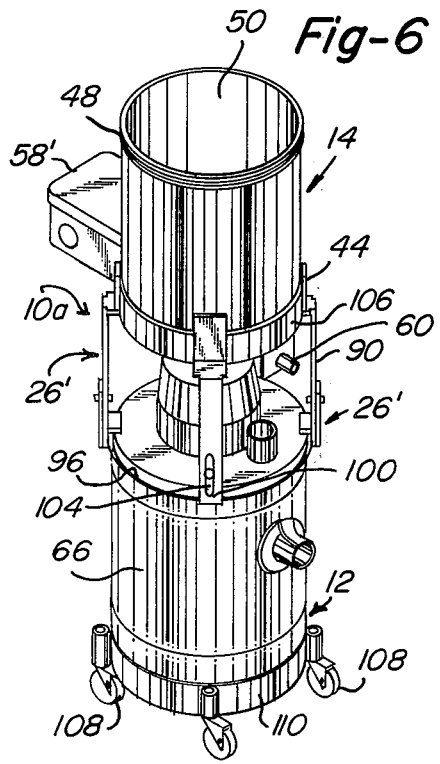
FIG. 6 is a perspective view of the connecting apparatus of FIG. 5 illustrated in use with a solution tank, a wet dry vacuum cleaner, and other elements forming a cleaning solution-extraction type cleaning apparatus.

Generally, the present invention involves a connecting apparatus 10 shown in FIG. 1 or in FIG. 5. The connecting apparatus is employed to connect a conventional wet dry vacuum cleaner 12 in an essentially vertically spaced relationship with a cleaning solution tank 14, as is shown in FIGS. 4 and 6. The connecting apparatus positions the wet dry vacuum cleaner 12 vertically above the solution tank 14, as is shown in FIG. 4, or positions the solution tank 14 vertically spaced above the wet dry vacuum cleaner 12, as is shown in FIG. 6. The connecting apparatus allows convenient and selective combination of a conventional and separate wet dry vacuum cleaner with the solution tank, thereby conveniently combining the elements necessary to form a cleaning solution-extraction type cleaning apparatus, such as a hot water extraction cleaner typically used in cleaning carpets and the like.

Figure 2:
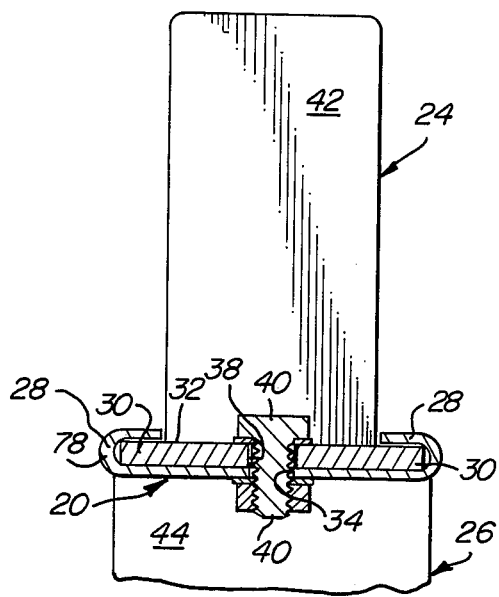
FIG. 2 is a section view taken substantially in the plane of line 2—2 of FIG. 1.

The connecting apparatus 10 shown in FIGS. 1 and 2 comprises a plurality of elongated arm members 20 mutually attached at a common center point 22 such as by welding. The arm members 20 extend from the center point 22 outward in essentially a single plane, with adjacent arm members preferably perpendicular to one another. Bracket members 24 and 26 are attached to each of the arm members 20 at selectable positions spaced from the center point 22 for the purpose of contacting and retaining the wet dry vacuum cleaner and solution tank in an essentially vertically spaced relationship, with the connecting apparatus 10 intermediate of the vacuum cleaner and solution tank. The number of arm members 20 may be varied depending upon the details of configuration of the solution tank and the vacuum cleaner and the amount of contacting and retaining force to be applied to these devices.

To attach the bracket members 24 to the arm members 20 at selected positions therealong from the center point 22, to accommodate a variety of different sized and configured vacuum cleaners and solution tanks, U-shaped longitudinal side edges 28 opening toward one another on the same side of each arm member 20 receive side edges 30 of a flat base portion 32 of the bracket member 24. A slot 34 is formed in each arm member 20 to extend essentially parallel along the longitudinal dimension of the arm member. The base portion 32 of each bracket member 24 includes an opening 38 located over the slot 34 in the various positions along the arm member 20 where the bracket 24 is positioned. Fastening means 40 in the form of a nut and bolt extend through the opening 38 and slot 34 to selectively attach and retain the bracket member at selected positions along the arm member 20.

Each bracket member 24 includes an upstanding projection 42 extending essentially perpendicular from the base portion 32, and consequently, extending essentially perpendicular with respect to the arm member 20. The upstanding projections 42 contact one of either of the vacuum cleaner 12 or the solution tank 14, depending on the manner of use of the connecting apparatus 10. Force directed along the arm members 20, applied by the projections 42 to the vacuum cleaner or solution tank, retains the connecting apparatus 10 to the vacuum cleaner or the solution tank.

The bracket members 26 contact and retain the other one of the vacuum cleaner 12 or the solution tank 14 not contacted and retained by the bracket members 24. Each bracket member 26 includes a projection 44 extending downward essentially perpendicular with respect to the arm member 20. Each projection 44 can be rigidly attached at the outer end 46 of each of the arm members 20, such as by welding, or the bracket 26 can be selectively and adjustably positioned along each of the arm members 20 by use of elements similar to those previously described in conjunction with the bracket member 24.

Figure 3:
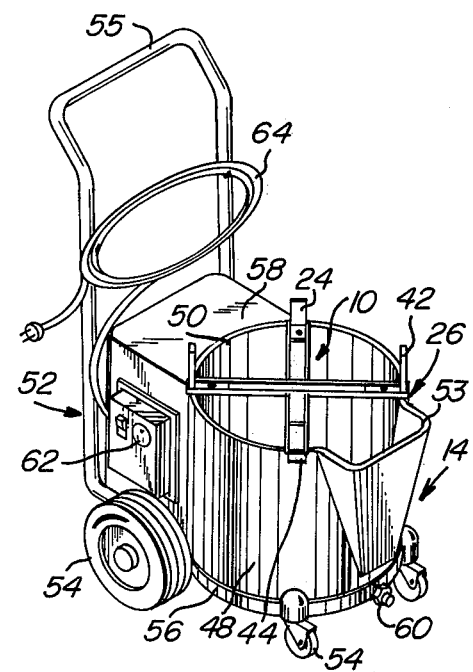
FIG. 3 is a perspective view of the connecting apparatus of FIG. 1 illustrated in use with a solution tank, a movable cart-like device, and other elements forming a part of a cleaning solution-extraction type cleaning apparatus.

The downward extending projections 44 of the bracket members 26 contact the outside periphery of the cylindrically shaped sidewall 48 of the solution tank 14 at its open upwardly extending mouth 50, as is shown in FIG. 3. The projections 44 contact the outside periphery of the tank's sidewall 48 to prevent the connecting apparatus 10 from sliding or moving off the open mouth 50 of the solution tank 14. A bottom wall (not shown) of the solution tank 14 is, of course, sealed to the sidewall 48 to form a fluid containing and receiving solution tank.

The solution tank 14 can be attached with its open mouth in a vertically upward position on a movable cart-like device 52. A trough 53 is formed in the sidewall 48 of the solution tank to conduct cleaning solution into and out of the tank 14. The cart-like device 52 includes wheels 54 and a handle 55 attached to a frame member 56 which allow the operator to easily position or move the cart-like device 52 and its associated apparatus at a position where use is intended.

A housing 58 connected to the cart-like device 52 contains the various typical control apparatus for securing combined operation of the vacuum cleaner and solution tank as a cleaning solution-extraction type cleaner. These typical control apparatus include a pump (not shown) for pumping cleaning solution from the solution tank 14 to an outlet 60, and electrical controls for controlling the pump and the wet dry vacuum cleaner when the electrical supply for the vacuum cleaner is connected to an electrical connector 62, and an electrical extension cable 64 for supplying electrical power to the elements comprising the cleaning solution extraction cleaner.

Shown in FIG. 4, the conventional wet dry vacuum cleaner 12 is positioned and retained by the connecting apparatus 10 to the solution tank 14 carried by the cart-like device 52. The vacuum cleaner 12 is of one typical construction which includes a canister-like body 66 having a vertically extending and cylindrically shaped sidewall 68. The bracket members 24 are adjusted at selected positions along each arm member 20 of the connecting apparatus 10 to contact the upstanding projections 42 with the vertically extending sidewall 68 of the vacuum cleaner 12 and to apply retaining force to the sidewall 68. In this manner, the vacuum cleaner is vertically positioned and retained above the open mouth 50 of the solution tank 14. Contact of the upstanding projections 42 with the sidewall 68 prevents the vacuum cleaner from slipping or moving from the position in which it is retained by the connecting apparatus 10.

To use the elements shown in FIG. 4 as a hot water or cleaning solution-extraction type cleaner, a wand-like cleaning tool 70 is operatively attached to the vacuum cleaner 12 and solution tank 14. A flexible hose 72 connects a vacuum outlet 74 of the cleaner 12 with a handle 76 of the wand-like tool 70. The handle 76 is constructed as a hollow conduit to conduct the vacuum of the vacuum cleaner to a vacuum nozzle 78 of the wand-like cleaning tool 70 positioned adjacent a carpet 80 or the like. Foreign material is removed from the carpet 80 by the vacuum at the vacuum nozzle 78 and the foreign material is connected into the interior of the canister body 66 by vacuum of the vacuum cleaner 12. A spray nozzle 82 of the tool 70 is connected through a tubing 84, a hand valve 86 and a flexible hose 88 to receive a pressurized supply of cleaning fluid delivered from the outlet 60 of the solution tank 14 by the pump positioned within the housing 58. The hand valve 86 is selectively controllable by the operator to deliver the cleaning fluid to the carpet 80 when needed. During manipulation of the wand tool 70 over the carpet, the cleaning solution wets the carpet and dissolves the foreign matter within the carpet, and the foreign matter and residual cleaning solution are thereafter extracted by the vacuum at the vacuum nozzle 78, thereby cleaning the carpet.

Another embodiment of the connecting apparatus, illustrated at 10a in FIG. 5 involves the use of alternative bracket members 26' to support the solution tank 14 in an essentially vertically spaced relationship above the vacuum cleaner 12, as is illustrated in FIG. 6. As shown in FIG. 5, elongated downwardly extending projections 90 are attached at the outer ends 46 of the arm members 20. Each projection 90 includes a tab 92 extending essentially perpendicular to the projection 90. A resilient pad member 94 is attached to each tab 92 to contact an upper cover member 96 attached to the canister body 66 of the vacuum cleaner 12. A lip 98 of an L-shaped bracket member 100 is positioned below the cover member 96, and the bracket member 100 is fastened to the projection 90 by a fastening means 102 such as a nut and bolt. A slot 104 extends along a portion of each bracket member 100 and allows selective positioning of the lip 98 relative to the pad 94 to accommodate different thicknesses of cover members 96 which may be employed on different vacuum cleaners.

Bracket members 24 attached by the fastening means 40 to the arm members 20 of the connecting apparatus 10a contact the outer sidewall 48 of the solution tank 14. In this manner, the solution tank 14 is retained to the connecting apparatus 10a on the side opposite the arm members 20 from the vacuum cleaner 12. If desired, a ring-like band member 106 can be positioned intermediate the upstanding projections 42 of the bracket member 24 and the sidewall 48 of the solution tank 14. The band member 106 further acts to contact the solution tank 14 and retain it in position.

As shown in FIG. 6, a housing 58' is connected to the connecting apparatus 10a, and the housing 58' contains the conventional pump and various other conventional associated controls for operating the vacuum cleaner 12 and the solution tank 14 as a cleaning solution-extraction cleaning apparatus, as has been previously described. The solution tank 14 is attached by the connecting apparatus 10a in a vertically spaced relationship above the vacuum cleaner, and the solution tank is positioned with its open mouth 50 in a vertically upward extending position. A plurality of roller wheels 108 are attached to a frame member 110 operatively connected to the bottom portion of the vacuum cleaner canister body 66. The wheels 108 allow the user to selectively move or position the cleaner 12, the solution tank 14 and the other elements combined as a cleaning solution-extraction cleaning apparatus, at a desired position for use.

The various elements of connecting apparatus previously discussed can easily be constructed out of suitable metal material such as steel.

It should be apparent that the connecting apparatus of the present invention provides wide latitude of adjustability in selectively positioning the bracket members 24 and 26 along the arm members 20. With the four arm members 20 arranged to extend perpendicularly from their adjacent arm members, rectangular or square shaped vacuum cleaners or solution tanks can be contacted and retained by the connecting apparatus as well as the cylindrically shaped vacuum cleaner and solution tank illustrated herein. The adjustability of the bracket members attached to the arm members allows a variety of different sized vacuum cleaners to be connected with a variety of different sized solution tanks, assuring a high degree of flexibility and interchangeability in accommodating a variety of different sized and configured vacuum cleaners and solution tanks.

It is also apparent that the connecting apparatus allows the solution tank and vacuum cleaner to be effectively combined and used as a hot water or cleaning solution-extraction type cleaning apparatus. By this arrangement, a separate wet dry vacuum cleaner can easily and conveniently be converted for use as a part of the cleaning apparatus. Furthermore, the vacuum cleaner can easily be disassociated from the elements comprising the cleaning apparatus if use of only the vacuum cleaner is desired. By the present invention, a cleaning solution-extraction type cleaning apparatus may be more economically obtained when combined with a preexisting wet dry vacuum cleaner.

The presently preferred embodiments of the invention have been described in detail to enable their full and complete understanding. However, it should be understood that the scope of the invention is not intended to be limited by this detailed description, but the invention herein is intended to cover all modifications, alterations, constructions, equivalents and uses falling within the spirit and scope of the appended claims.

What is claimed is:

1. In apparatus for connecting a wet dry vacuum cleaner in an essentially vertically-spaced relationship with a cleaning solution tank for combined use as a cleaning solution extraction-type cleaning apparatus, the wet-dry vacuum cleaner having a body with sidewalls and the solution tank having sidewalls and an open upper mouth, an improved connecting apparatus comprising:

at least four elongated arm members joined together at a common point and extending horizontally outward from the common point essentially in a single plane, each of said arm members extending longitudinally from the common point to an outer end thereof, each of said arm members being equally angularly spaced with respect to both of its adjoining arm members, each of said arm members including two transversely spaced apart and longitudinally extending U-shaped edges, each of the U-shaped edges extending longitudinally substantially along the total length of each arm member from the common point to the outer end thereof, the U-shaped edges opening toward one another on an upper vertical side of each arm member, each of said arm members further including means defining a slot extending substantially parallel to and intermediate of the U-shaped edges along said arm members;

one first bracket member operatively associated with each arm member, each first bracket member having a base portion and an upstanding projection portion, the upstanding projection portion extending substantially perpendicularly with respect to the base portion, the base portion of each first bracket member being operatively transversely received within the transversely spaced-apart width defined by the transversely spaced-apart U-shaped edges opening toward one another, the receipt of the base portion within the space between the U-shaped edges operatively allowing only longitudinal movement of said first bracket member along the longitudinal dimension of the arm member with which it is associated, the upstanding projection portion contacting the sidewalls of one of either of said vacuum cleaner body or said solution tank;

fastening means operatively connected to the base portion of each said first bracket member and extending into the slot defined in said arm member with which the first bracket member is associated, said fastening means being selectively operative to retain said base portion against longitudinal movement along said arm member; and one second bracket member rigidly attached at the outer end of each arm member, each second bracket member having a projection portion extending essentially perpendicularly and vertically downward with respect to the longitudinal dimension of said arm member, the projection portion of said second bracket member contacting the sidewalls of the other one of either of said vacuum body or said solution tank.

2. An improved connecting apparatus as recited in claim 1 further comprising, in combination:

a ring-like band member of circular configuration received interiorly of the upstanding projection portions of said first bracket members, said ring-like band member extending in contact with all of the upstanding projection portions of said first bracket members.

* * * * *